June 29, 1965 — E. P. OLSON — 3,192,375
ILLUMINATED LEVEL
Filed May 14, 1964
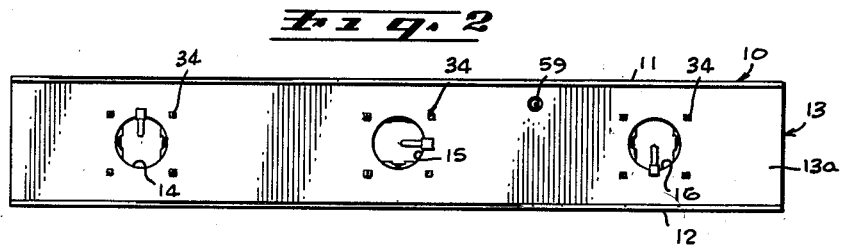
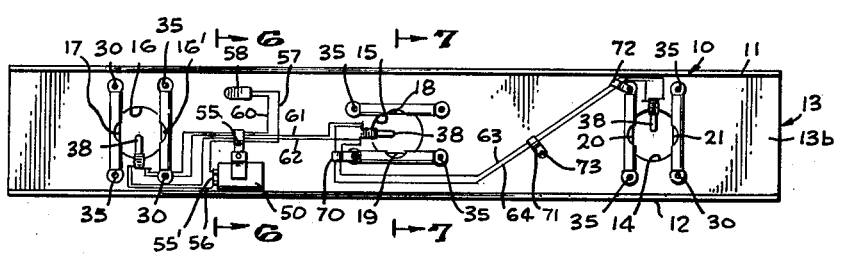
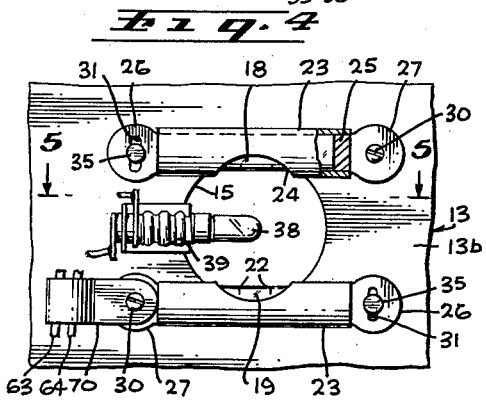
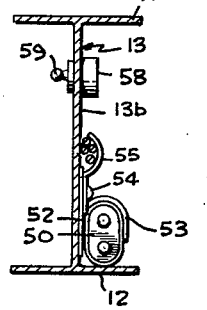
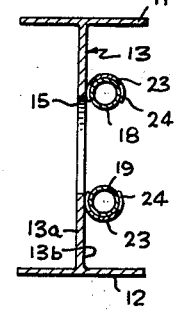
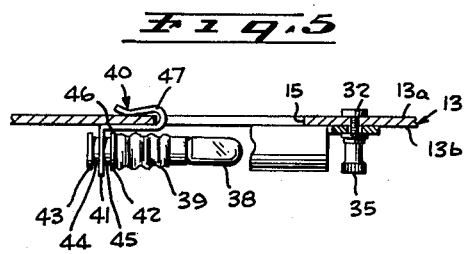
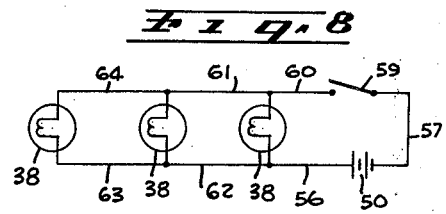
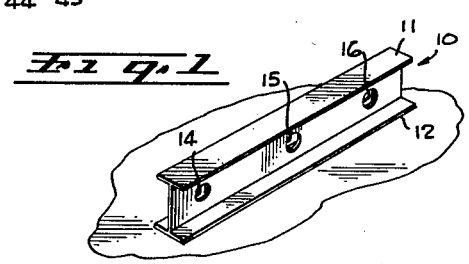
ENOK P. OLSON
INVENTOR.
BY R. E. Geangue
ATTORNEY

United States Patent Office 3,192,375
Patented June 29, 1965

3,192,375
ILLUMINATED LEVEL
Enok P. Olson, Oroville, Calif.
(P.O. Box 51, Big Pine Inyoco, Calif.)
Filed May 14, 1964, Ser. No. 367,324
1 Claim. (Cl. 240—6.44)

This invention relates to an illuminated level and more particularly to a level which can be utilized in dark corners and other dark locations where it is impossible to utilize the standard level.

Standard levels are equipped with liquid columns which are sensitive to inclination of a surface along both the longitudinal and transverse directions of the device and the inclination is indicated by a bubble in the liquid. Each of the level indicating stations can comprise two liquid columns which are opposed to one another and which are placed on opposite sides of an opening in the level. The present invention makes it possible to observe the pair of liquid columns at each of the indicating stations by providing a lamp which clearly illuminates each pair of columns so that the device can be utilized in very dark locations. The lamps are adjustable relative to the openings through which the bubbles are observed so that no glare will result and the bubbles can be easily observed. The liquid columns are also adjustable so that the bubbles can be calibrated to provide true readings with respect to the surface of a structure.

In the preferred form, the level comprises an I beam having two flanges and an intermediate web on which the liquid columns and the illuminating lamps for the columns are supported. The battery and switch for the lamp circuit can also be mounted on the web, and the flanges on the opposite ends of the web serve to protect all of the structure mounted on the web. One side of the web is clear of components and is utilized for observing the level readings so that the operator will not be distracted. While the illuminating level of the present device comprises an instrument which must be handled carefully, the operators of level devices are accustomed to carefully handling the devices because of the fragile structure of the standard devices.

It is therefore an object of the present invention to provide an illuminated level which comprises pairs of spaced liquid columns containing bulbs for reading both longitudinal and transverse inclinations and having an illuminating lamp located between each pair of the spaced liquid columns.

Another object of the invention is to provide a level having spaced liquid columns located at opposite edges of an opening in the level structure through which the bubbles in the columns are observed, said column being illuminated by a lamp located centrally of the opening and in between the two liquid columns.

Another object of the invention is to provide liquid columns containing bubbles which are mounted in pairs on one side of the web of an I beam structure to sense both transverse and longitudinal inclination, said column being small enough to be protected by the flanges of the I beam structure.

A further object of the invention is to provide a plurality of opposed pairs of liquid columns containing leveling bubbles and having a lamp between each pair, the columns being adjustable relative to one another so that the bubbles will correctly indicate the inclination in a direction in which the bubbles are sensitive.

These and other objects of the invention not specifically set forth above will become readily apparent from the accompanying description and drawings in which:

FIGURE 1 is a perspective view of the illuminated level of the subject invention.

FIGURE 2 is a top plan view of the illuminated level from which the liquid columns are observed.

FIGURE 3 is a bottom plan view of the web on which the liquid columns and the illuminating circuit are mounted.

FIGURE 4 is an enlarged view of a portion of FIGURE 3 showing the central viewing opening and the mounting for the lamp and two opposed liquid columns adjacent the opening.

FIGURE 5 is a horizontal section along line 5—5 of FIGURE 4 illustrating the manner in which the illuminating lamp is mounted on the web of the I beam structure.

FIGURE 6 is a vertical section along line 6—6 of FIGURE 3 showing the switch knob on the observation side of the web and the battery mounted on the component side of the web.

FIGURE 7 is a vertical section along line 7—7 of FIGURE 3 showing the manner in which the opposed liquid columns are mounted on the web of the I beam structure; and FIGURE 8 is a schematic wiring diagram for the three illuminating lamps which are connected in parallel with the battery through the switch.

Referring to the embodiment of the invention chosen for illustration, the illuminated level consists of an I beam structure 10 having opposite flanges 11 and 12 which are connected together by an intermediate web 13. The web 13 contains three circular openings 14, 15, and 16 located along the length of the level for viewing bubbles in opposed pairs of liquid columns. Liquid columns 16 and 17 are located at opposite edges of opening 14, columns 18 and 19 are located at opposite edges of opening 15 and columns 20 and 21 are located at opposite edges of opening 16. The opening 15 is used for leveling in the longitudinal direction while openings 14 and 16 are used for leveling in the transverse direction. Each of the columns has a pair of center marks 22 between which the bubble in the column must be located when the structure upon which the level is placed is level in the sensitive direction.

A metal sleeve 23 surrounds each of the columns and has a cutout 24 for viewing the markings 22 and the bubble within the liquid column. The ends of each sleeve contain a compound 25 which holds the liquid column in position within the sleeve and each sleeve has end projection 26 and 27 which lie flat against surface 13a of the web 13 for attachment thereto. One sleeve end 27 has a circular opening which snugly fits a mounting bolt 30 while the other sleeve end 26 has a slot 31 which permits sliding movement relative to the mounting bolt 32. Thus, each metal sleeve can be rotated about the bolt 30 and the column brought into proper position before tightening of bolt 32 so that the column will properly indicate the inclination of a surface. The positioning of the columns is accomplished by placing the structure 10 on a known level surface and moving the columns to locate the bubbles between the markers 22. The bolts 30 have lock nuts 34 located on the surface 13a of web 13 whereas the bolts 32 have hand adjustable nuts 35 on the surface 13b for readily adjusting the position of the liquid columns.

Each of the liquid columns is located with respect to its associated opening so that the cutaway portion 24 of each metal sleeve 23 is adjacent the edge of the opening and approximately one half of a liquid column and markers 22 thereon are shown at each edge of each opening. A lamp 38 is located in each opening intermediate each pair of liquid columns and is mounted in a socket 39 extending along the web 13. The socket is supported by a plate 41 forming a part of spring clip 40 and the terminals for the lamp 38 are connected to plates 42 and 43 which are separated from the mounting plate 41 by insulating washers 44 and 45. A portion 46 of clip 40 extends along the surface 13b of web 13 and is curled around to form a spring hook 47 which engages the web 13 at the edge of the associated opening. It is therefore apparent that the position of the lamp 38 can be adjusted with respect to its associated opening and pair of columns and thereby provide the proper illumination for observing the bubble in each of the columns relative to the marks 22.

A battery 50 is located along the surface 13b of web 13 and is secured thereto by a bracket having a base portion 52 and a spring clamp portion 53 which snaps over the battery to secure same. The base 52 is secured to the web 13 by bolt 54 which also holds down a wire clamp 55 which holds four leads adjacent the surface 13b of the web 13. A lead attachment plate 55' is snapped onto the terminals of battery 50 and mounts leads 56 and 57 which energize the lamp circuit. As illustrated in FIGURE 3, lead 56 goes directly to the plate 42 of bulb 38 in opening 16 and the lead 57 goes from the battery to switch 58 which is mounted on the surface 13b of the web 13. Knob 59 for switch 58 extends through to the surface 13a so that it can be operated when the level is in the operating position of FIGURE 2. A lead 60 connects the switch 58 to the terminal plate 43 of the lamp 38 in opening 16 in order to complete the circuit for this lamp. Leads 61 and 62 extend from the terminal plates 42 and 43 of the lamp in opening 16 to the same terminal plates for the lamp in opening 15 in order to distribute power to this lamp. Leads 63 and 64 extend from the plates 42 and 43 of the lamp in opening 15 to the corresponding plates for the lamp 38 in opening 14. The clamp 55 secures the four leads 57, 60, 61 and 62 while leads 63 and 64 are secured by clamps 70, 71 and 72. A bolt 30 secures clamps 70 and 72 while a bolt 73 secures clamp 71. By use of the clamps 55, 70, 71 and 72, the wiring is kept snugly within the area defined by the flanges 11 and 12 on opposite side of surface 13b. Referring to FIGURE 8, the schematic wiring diagram shows the three lamps 38 connected in the parallel by the various leads.

In utilizing the invention, the level is placed upon a surface to be gauged with the surface 13b down toward the surface and the surface 13a in the observer's view as indicated in FIGURE 2. The bubbles in the liquid columns opposite opening 15 can be centered to place the surface in a longitudinally level condition and the bubbles in the openings 14 and 16 can be centered to place the surface in a transverse level condition. If the structure to be leveled is in a bright location, it is unnecessary to have further illumination. However, as is often the case in the construction of buildings and other structures, it is necessary to level surfaces which are in dark corners or dark areas. When this becomes necessary, it is only necessary to operate the switch 59 which will illuminate all the lamps 38 in the three openings and give a clear view of the bubble associated with the liquid column. Thus, the structure could be properly leveled without the necessity of the operator handling a separate light source while trying at the same time to operate the level.

As previously indicated, the location of the lamps 38 relative to the liquid columns can be adjusted so that the best illumination possible is obtained for the bubbles in the adjacent column. By having all of the electrical installation on the lower surface 13b of the web 13, this equipment does not distract the operator when using the level since this surface presents a clean appearance to the operator. It is understood that the manner of mounting the liquid columns and supporting the lamps 38 can be varied and that the circuitry for the lamp can also be varied by using a plurality of separate batteries. Various other modifications are contemplated by those skilled in the art without departing from the spirit and scope of the invention as hereinafter defined by the appended claim:

What is claimed is:

An illuminated level comprising:

a support member; an opening in said support member;

a pair of liquid columns located at opposite edges of said opening, each column having centering marks thereon;

a bubble in each of said columns for leveling said support member by locating same at said centering marks;

lamp means located between said columns for illuminating said mark and bubbles in dark locations;

a socket for said lamp means attached to the edge of said opening and extending substantially parallel to said liquid columns;

said support member comprising an I beam structure having side flanges and a web in between, said socket and said liquid columns being located on one surface of said web and being confined within the flanges on the opposite sides of said web;

said socket for said illuminating means being adjustably connected to the edge of said opening means for positioning transversely and longitudinally with respect to said liquid columns;

said socket being secured to the edge of said opening by means of a spring clip gripping the edge of said opening.

References Cited by the Examiner
UNITED STATES PATENTS

| | | | |
|---|---|---|---|
| 1,298,844 | 4/19 | Wichertjes | 33—214 |
| 1,462,054 | 7/23 | Tangee | 240—6.44 |
| 1,566,541 | 12/25 | Kibry | 240—52.5 |
| 2,922,874 | 1/60 | Clerk et al. | 240—6.44 |
| 3,114,507 | 12/63 | Dommer | 240—6.44 |

NORTON ANSHER, *Primary Examiner.*